United States Patent

[11] 3,596,278

| [72] | Inventor | Masanori Kobayashi<br>Tokyo, Japan |
|---|---|---|
| [21] | Appl. No. | 776,061 |
| [22] | Filed | Nov. 15, 1968 |
| [45] | Patented | July 27, 1971 |
| [73] | Assignee | Kabushiki<br>Tokyo, Japan |
| [32] | Priority | Nov. 17, 1967 |
| [33] | | Japan |
| [31] | | 42/73856 |

[54] RECORDING PAPER INDICATING MECHANISM
7 Claims, 15 Drawing Figs.

[52] U.S. Cl. .................................................... 346/17,
346/137
[51] Int. Cl. ..................................................... G01d 18/00
[50] Field of Search ........................................... 346/17, 18,
137, 14, 124, 131, 121—123

[56] References Cited
UNITED STATES PATENTS

| 2,077,242 | 4/1937 | La Pierre .................... | 346/136 X |
| 3,066,299 | 11/1962 | Kampf ........................ | 346/136 X |
| 1,445,214 | 2/1923 | Hollingdrake ................ | 346/137 X |
| 3,281,854 | 10/1966 | Fiehn ......................... | 346/18 |
| 3,331,081 | 7/1967 | Sihvonen et al. ............. | 346/136 |

*Primary Examiner*—Joseph W. Hartary
*Attorneys*—Robert E. Burns and Emmanuel J. Lobato ABSTRACT: Mechanism for visually indicating the amount of the unused or unrecorded portion of the recording paper utilized in a tachograph to record measurements taken by the tachograph and for indicating when the recording paper should be replaced.

PATENTED JUL 27 1971

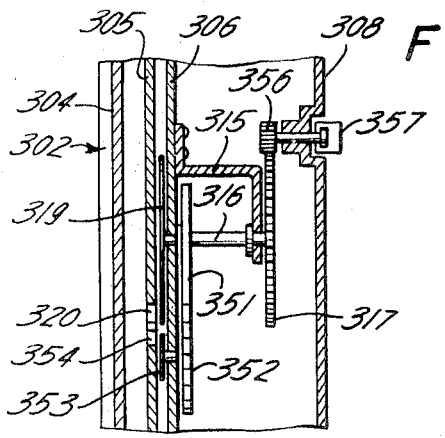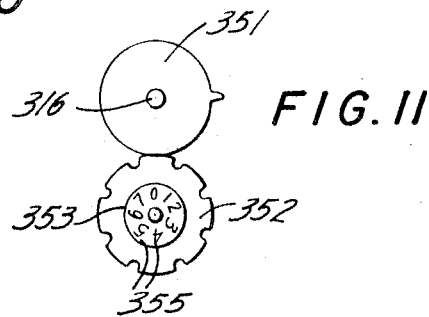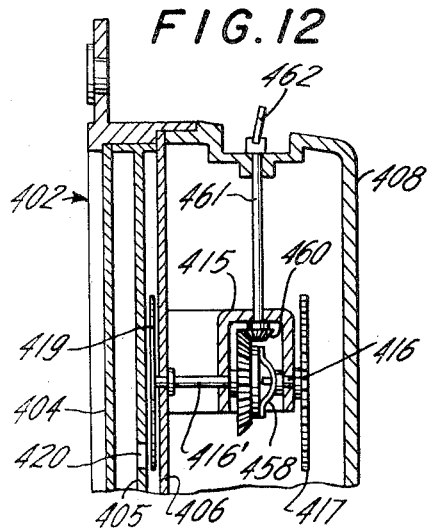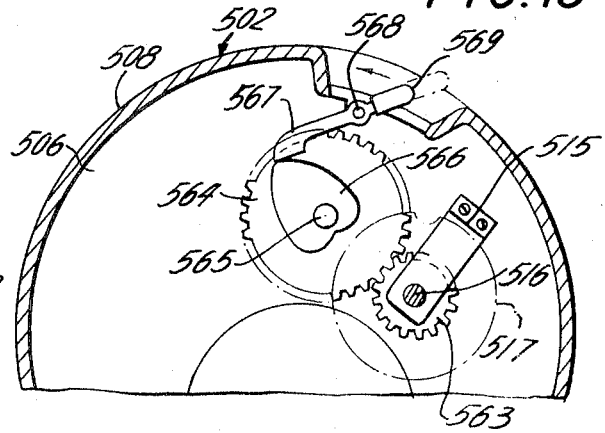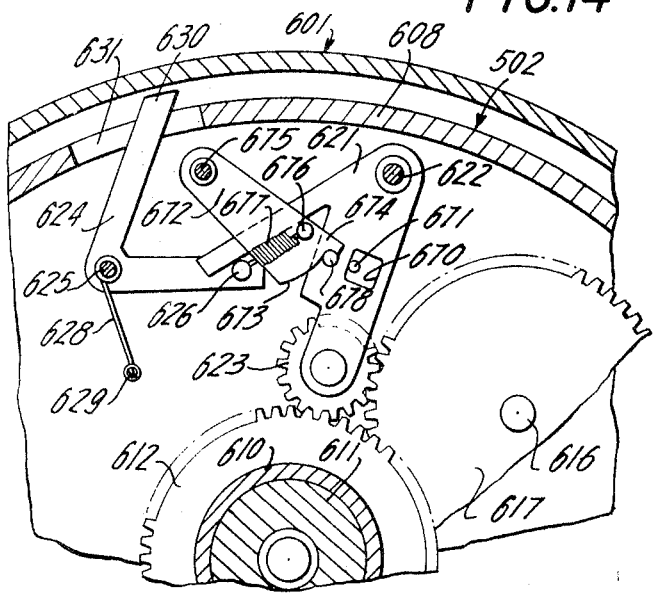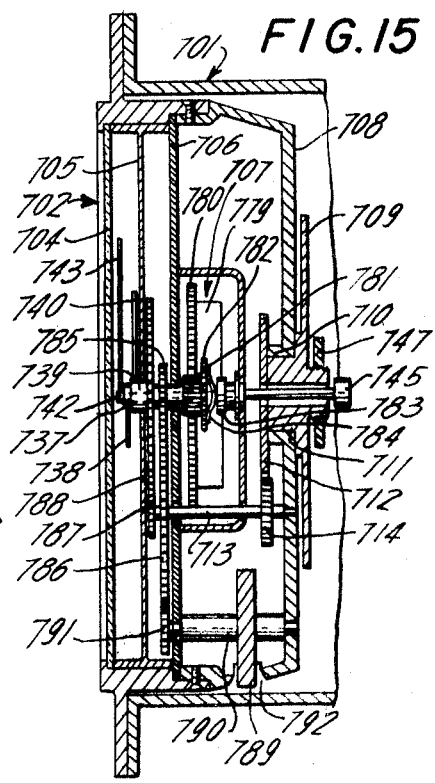

RECORDING PAPER INDICATING MECHANISM

BACKGROUND OF THE INVENTION

1. Field of the Invention

This invention relates generally to mechanism in a tachograph by determining when the recording paper should be replaced.

2. Description of the Prior Art

Known tachographs are provided with a circular recording paper mounted on a rotating disc that is rotated at a constant speed and is utilized to record, for example the speed, distance traversed etc. of an automobile by connecting measuring apparatus a recording pen that in turn traces a path on the recording paper. Since the pen continues to record on the paper even after the recording paper has rotated a complete revolution, overlapping very often occurred because prior to the present invention no way was provided to check the extent of the recordation without opening the mechanism to inspect the recording paper which was otherwise hidden from view.

SUMMARY OF THE INVENTION

This invention eliminates the aforementioned disadvantage of the conventional tachograph, and provides a novel and improved mechanism for visually inspecting or monitoring the extent of the unused recording paper in a tachograph without having to open the tachograph.

Accordingly, one object of this invention is to provide mechanism for visually indicating when a recording paper in a tachograph must be replaced to prevent overlapping on the recording paper.

Another object of this invention is to provide mechanism to allow a viewer visually to observe the extent of the recordation that has occurred in a tachograph.

A still further object of this invention is to provide in a mechanism for indicating the extent of the recordation that has occurred in a tachograph, apparatus for automatically resetting such a mechanism when the completed recording paper is replaced.

Still another object is to provide in a mechanism for giving an indication of the extent of the recordation that has occurred in a tachograph, apparatus for preventing its operation when the tachograph is opened.

With the above and additional objects and advantages in view as will hereinafter appear this invention comprises the devices, combinations, and arrangements of parts hereinafter described and illustrated in the accompanying drawings of preferred embodiments.

BRIEF DESCRIPTION OF THE DRAWINGS

FIG. 10 is a sectional view of a part of another embodiment of an indicating means and indicating plate returning means of the present invention;

FIG. 11 is a plan view of an intermittent gear in the embodiment shown in FIG. 10;

FIG. 12 is a sectional view of another embodiment of the indicating plate returning means of the present invention;

FIG. 13 is a sectional view of a part of another embodiment of the indicating returning means of the present invention;

FIG. 14 is a sectional view of a part of another embodiment of a clutch means of the present invention; and FIG. 15 is a sectional view of the front portion of the tachograph of the present invention including time hands and a compensating means for the recording paper supporting disc.

DESCRIPTION OF THE PREFERRED EMBODIMENT

Figure 1:
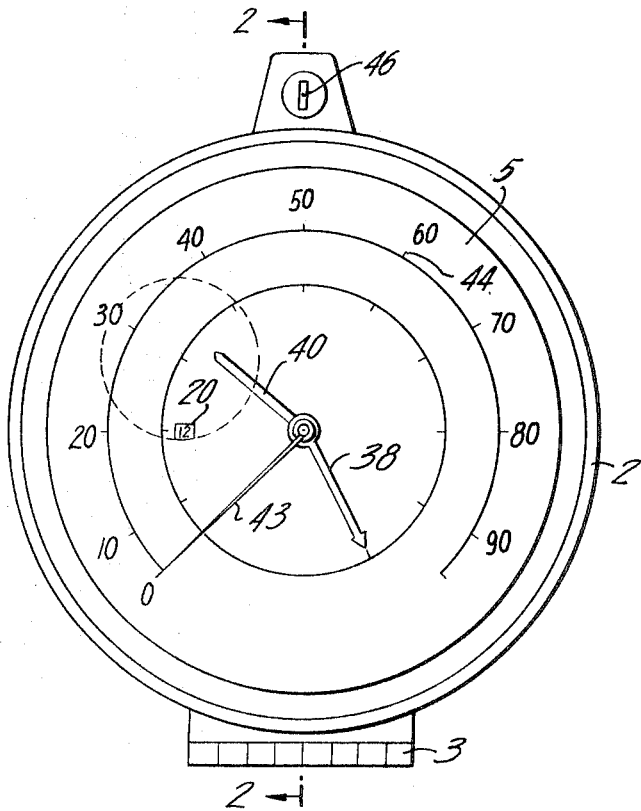
FIG. 1 is a front elevational view of a tachograph of the present invention.
Figure 2:
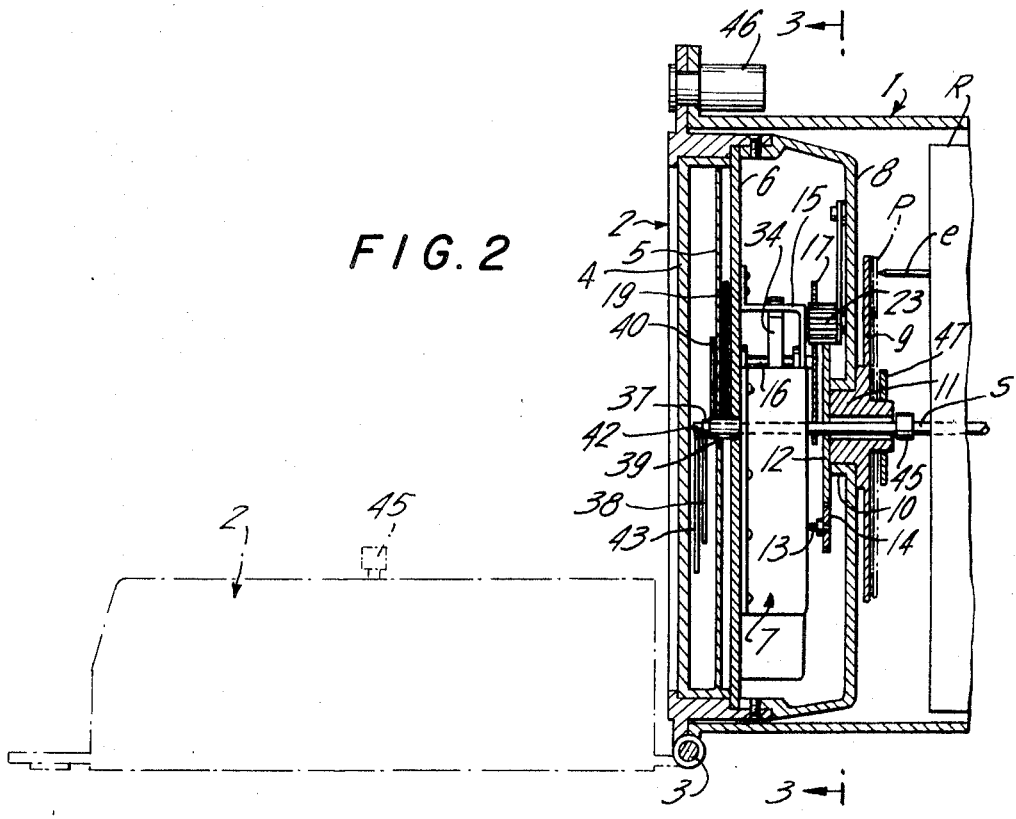
FIG. 2 is a sectional view taken along line II–II of FIG. 1.
Figure 3:
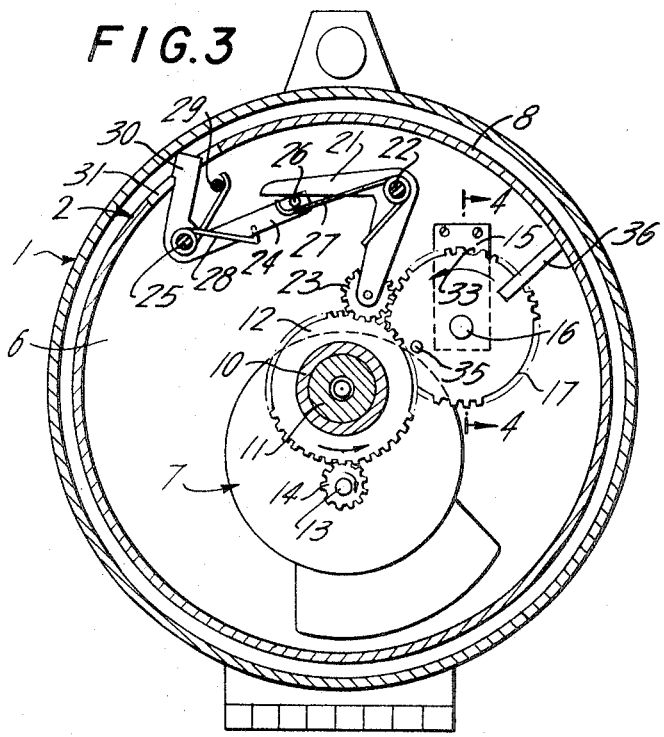
FIG. 3 is a sectional view taken along line III–III of FIG. 2.

Referring to the drawings, particularly to FIGS. 1 to 3, a recording support frame 2 is pivotally mounted by a hinge 3 to the front end of a cylindrical tachograph frame 1 to allow the frame 2 manually to be pivoted outwardly away from the tachograph frame 1. The frame 2 is utilized to support a speed indicating means, clock mechanism and mechanism to indicate the amount of the unused recording paper. Within the frame 1 a speed recording device R is contained, and a recording pen e projects from the device R.

To the front of the recording support frame 2 there is mounted a circular glass cover 4 and rearwardly (FIG. 1) of the cover 4 a circular indicia plate 5 and behind the plate 5 a baseplate 6. The back of the frame 2 is closed by an apertured rear cover 8. A recording paper supporting disc 9 is mounted rearwardly of cover 8 and secured on a short shaft 11 which is formed with a bearing 10 that is received by an aperture formed in the center of the rear cover 8. A gear 12 is fixedly secured to the front face of the shaft 11 as can be seen by reference to FIG. 2. The gear 12 engages a pinion 14 fixed to an interlocking shaft 13 of the clock mechanism 7 which in turn is mounted on the baseplate 6. The paper supporting disc 9 may be driven at a low speed of, for example, 1 revolution per 24 hours by the watch mechanism 7 through the connections described.

Figure 5:
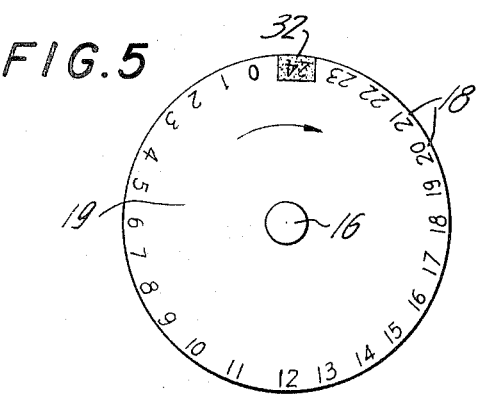
FIG. 5 is an enlarged plan view of an indicating plate of the present invention.

A means for indicating to an observer the amount of recordation inscribed on a sheet of recording paper P mounted on the disc 9 will be now described. A bracket 15 is mounted on the back face of the baseplate 6 and an indicating shaft 16 is rotatably mounted on the bracket 15 and the baseplate 6. To the rear end of the shaft 16 is fixedly secured an indicating plate gear 17, and at the front end thereof is fixed a circular indicating plate 19 on the peripheral edge of which is marked a set of indicia illustrated in FIG. 5 as numbers 0—24 which are arranged to show the length of time during which the paper supporting disc 9 has been rotating. A window or opening 20 is provided in the indicia plate 5 as shown best in FIG. 1 at a position on the board 5 aligned with the path of indicia 18 at the bottom of the indicating plate 19 to allow an observer to read one of the numerals (0—24) at a time. The angular velocity of the indicating plate 19 in the embodiment shown adjusted to the ratio of 1 to 24/25 against the recording paper supporting disc 9.

In the gear train for transmitting the rotation of the interlocking shaft 13 to the indicating plate shaft 16, there is provided a lever type clutch mechanism. Referring to FIG. 3, a bellcrank rocking lever 21 is rockably supported on a shaft 22 in turn mounted on the rear cover 8. A rocking gear 23 is rotatably mounted on the free end of the leg of the lever 21 to engage rocked gears 12 and 17 as shown in FIG. 3. A bellcrank actuating lever 24 is pivotally supported on a shaft 25 and has formed on one leg therein a pin 26 that projects from one end face of the lever 24 and is disposed to engage an edge of the other leg of the rocking lever 21. The levers 21 and 24 are arranged such that when the actuating lever 24 rocks in a clockwise direction (looking in the direction of the face of the unit, i.e. as seen looking at FIG. 1) the rocking lever 21 is rocketed by the pin 26 in a counterclockwise direction, thereby to move gear 23 away from engagement with the gears 12 and 17. A spring 27 is engaged at one end with one leg of the lever 21 and at the other end with the pin 26 of the lever 24 so that it urges lever 21 in the clockwise direction (FIG. 1), i.e. to urge the rocking gear 23 into engagement with the gears 12 and 17. A spring 28, which is stronger than the spring 27, is engaged at one end with one leg of the lever 24 and at the other end with a fixed pin 29 so that it urges the lever 24 in a clockwise direction (FIG. 1).

The clutch mechanism described in the preceding paragraph is operated automatically by the opening and closing of the cover 2. Thus, the free end of one leg of the actuating lever 24 is formed with a latch finger 30, which protrudes through a slot 31 in the rear cover 8. When the frame 2 is pivoted away from the frame 1, the latch finger 30 is free to move from the retracted position shown in FIG. 3 by the force exerted by the spring 28 which pivots the actuating lever 24 in a clockwise direction (FIG. 1), thereby to pivot the rocking lever 21 to rock in a counterclockwise direction to disengage the rocking gear 23 from the gears 12 and 17. When the frame 2 is pivoted into the frame 1 the latch finger 30 is pressed against the inner surface of the frame 1 thereby to pivot the levers 24 and 21 to bring them each to the positions shown in FIG. 3 with the gear 23 in engagement with the gears 12 and 17.

Although the elapsed recording time on the degree of rotation of the indicating plate 19 may be easily ascertained simply by reading the number exposed in the opening 20, the present invention provides that the numeral 24 may be colored (FIG. 5) for example, red, to provide a more visible warning that the 24 hour recording period has elapsed. In lieu of the numeral 24 another figure or symbol may be used to alert an observer.

A further refinement of the present invention provides for a continuous visual notification that the recording paper has rotated 1 revolution. When the warning indication 32 is viewed through the opening 20 a cutout portion 33 (FIG. 6) formed in the rim of the gear 17 receives the rocking gear 23. Thus, at the point that the indicating plate 19 rotates one revolution so that the warning indication 32 is presented through the opening 20 the cutout portion 33 receives the rocking gear 23 thereby to disengage the teeth of the gear 23 with the teeth of the gears 12 and 17 thereby to stop the rotation of the indicating plate.

Figure 4:
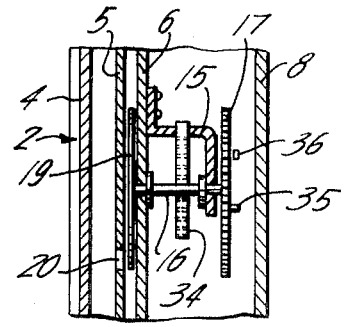
FIG. 4 is a sectional view taken along the line IV–IV of FIG. 3.

After a recording has been completed and the paper removed and a new recording paper must be mounted on the disc 9 the indicating plate 19 must be returned to its original starting position so that the numeral 0 may be once again received through the opening 20. For this purpose a coil spring 34 is mounted by one end to the bracket 15 and by its other end to the shaft 16 as shown in FIG. 4 such that when the clutch is disengaged, i.e., when the frame 2 is pivoted away from the frame 1, the gear 17 and indicating plate 19 are returned by means of the bias of the spring 34 to their original positions. When the bias of the spring effects a reverse rotation of the gear 17 and plate 19, it can be understood that further elements must be provided to stop the gear and plate at the desired positions. To this end a stop pin 35 is formed on the gear 17 to engage a stop stud formed on the rear cover 8 at the point in the reverse rotation of the gear 17 that effects the desired alignment of the plate 19.

An hour hand 40 is mounted on an hour hand shaft 39, projecting from the clock mechanism 7 through the indicia plate 5, and a minute hand 38 is mounted on a minute hand shaft 37 also protruding through the indicia plate 5. A speed indicating hand 43 is mounted to a speed hand shaft 42 which passes through the minute hand shaft 37. To the front surface of the indicia plate 5 an hour scale 41 and speed scale 44 are inscribed. The rear end section of the speed hand shaft 42 extends through the center of the supporting disc 9, and at its protruding end a coupling 45 is provided to engage the shaft S of the speed meter when the support frame 2 is pivoted into engagement with the frame 1.

The operation of the present apparatus will now be explained. The frame 2 is pivoted to the position shown by the dot and dash line in FIG. 2, and a sheet of recording paper P for 24 hour recording period is mounted on the supporting disc 9 and affixed thereto by the nut 47. Next the frame 2 is pivoted to the closed position as shown by the solid lines in FIG. 2 and held in that position by a lock 46. When the frame 2 is in the closed position the supporting disc 9 is rotated by the clock mechanism through the drive shaft 13, gears 14 and 12, and the recording paper P is contact by the recording pen e to record the speed of the mechanism being measured. Simultaneously the indicating plate 19 is rotated through the drive shaft 13, gears 14, 12, 23, 17, and shaft 16. As the recording time passes, the indicating plate 19 rotates to indicate the elapsed recording time through the opening 20. When the last number on the plate 19, number 24, appears in the opening 20 and the warning indication 32 is presented, the viewer is apprised of the fact that the recording paper P has rotated one revolution and that there is no further room for recording.

Figure 7:
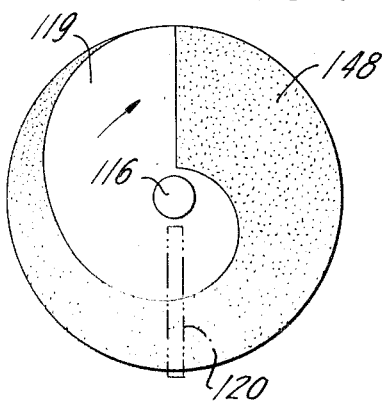
FIG. 7 is an enlarged plan view of another modification of the indicating plate of the present invention.
Figure 8:
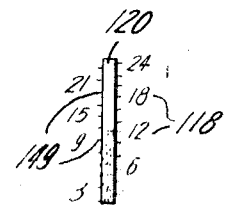
FIG. 8 is an enlarged plan view of another modification of an indicating opening of the present invention.

Further embodiments of the present invention will now be described. Referring to FIG. 7 there is shown an indicating plate 119 for indicating the extent of the recordation on the recording paper by utilizing a graph or area ratio that may be viewed through an elongated slot 120 formed in the indicia plate 5. This graphical indication 148 shows the angular velocity of the supporting disc 9 by a spiral graph with the coordinates having a circumference of the indicating plate as the abscissa and a radius as the ordinate. Preferably, the area 148 may be colored for a convenient viewing. The elongated sides of the slot 120 may be provided with a scale 149 (FIG. 8) divided into 24 equal spaces numbered to indicate the recordation period.

Figure 9:
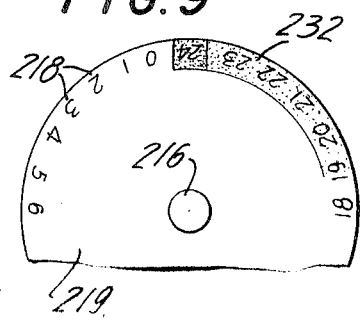
FIG. 9 is an enlarged plan view of a portion of another embodiment of the indicating plate of the present invention.

FIG. 9 shows a further embodiment of the present invention provided with a warning indication 232 that is colored darker gradually from the lower to the highest number 24 which is the darkest thereby providing a viewer with an added appreciation or indication of the point in the recording cycle that has been reached.

Figure 6:
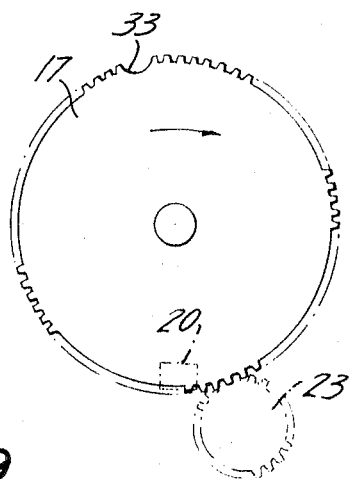
FIG. 6 is an enlarged plan view of an indicating gear of the present invention.

Another embodiment as shown in FIGS. 10 and 11 discloses mechanism for indicating the amount of recordation that has taken place over a period of within a maximum time of one week. To a shaft 316 mounted on the bracket 315 there is fixedly secured an indicating plate 319. An indicating opening 320 is formed in the indicia plate 305. A prime mover or wheel 351 of an intermittent gear device as shown in FIG. 11 is secured to a shaft 316 which is journaled in a baseplate 306 and arranged to engage a follower wheel 352 which is rotated at one-eighth of 1 revolution of the wheel 351. Another indicating plate 353 is fixed to the shaft 316. To the indicating plate 353, a set of indicia 355 (numbered 0 to 7) is utilized to indicate the number of the days in a week, and another indicating opening 354 is formed in the indicia plate 305 for exposing the number that corresponds to the elapsed recordation time. In the present embodiment, the apparatus for returning the indicating plate to its original position upon completion of the recordation cycle is manual rather than automatic, as disclosed in the embodiment shown in FIG. 4. The manual return apparatus includes a returning pinion 356 that engages an indicating plate gear 317 that is rotated by the clock mechanism, the shaft of the pinion 356 arranged to project through the back of the rear cover 308. A knob 357 is mounted on the end of the projecting end of the pinion shaft 356. The indicating plates 319 and 353 may be returned to their original positions by manually rotating the knob 357 after the support frame 302 is pivoted to the open position. In the manual rotating type return mechanism of this embodiment, the cutout portion of the teeth as shown in FIG. 6 cannot be provided for the gear 317. However, this embodiment is provided with means for transmitting the rotation from the clock mechanism to the gear 317 by a lever type clutch mechanism having a rocking gear which is substantially the same as that shown in FIGS. 1 to 4.

FIG. 12 shows still another embodiment of the present invention in which mechanism is utilized to return the indicating plate to its original position. Thus, to a shaft 416 rotatably supported on a bracket 415 is secured a gear 417 to which rotation is transmitted from the clock mechanism. The shaft 416' fixed to the indicating plate 419 is rotatably supported by the bracket 415 which bracket is in turn mounted on a baseplate 406. To the opposite end section of both shafts 416 and 416' are provided flanges between which a plate spring 458 is mounted. A bevel gear 459 is secured to the shaft 416' and a bevel gear 460 which engages the gear 459 is mounted on one end section of a shaft 461. The other end section of the shaft 461 protrudes through the rear cover 408 and has mounted on that end a knob 462. In this return mechanism, the rotation is transmitted from the clock mechanism to the gear 417 by means of a gear train, but a lever type clutch mechanism as shown in FIG. 3 is not provided and the gear 417 is a gear which does not have the cutout portion 33 such as is shown in FIG. 6. When the gear 417 is rotated by the clock mechanism, its rotation is transmitted through the shaft 416, spring 458 and shaft 416 to the indicating plate 419. After the recording has been completed, in order to return the indicating plate 419 to the original recording start position, the frame 402 is pivoted to the open position and the knob 462 is manually rotated thereby to rotate the bevel gears 460 and 459 and the shaft 416 to rotate the indicating plate 419. In this case, the gear 417 is not rotated. The reference numerals 404, 405 and 420 shown in FIG. 12 designates elements substantially the same as the corresponding elements shown in FIGS. 1 to 4.

FIG. 13 shows another embodiment of a return mechanism for the present invention. An indicating plate is secured to one end of the shaft 516 which is supported on the fixed bracket 515, and a gear 517 for transmitting rotation from the watch mechanism is secured to the other end. To this shaft 516 is secured a pinion 563 instead of the spring 34 in FIG. 4, and a gear 564 is mounted to engage the pinion 563. The gear 564 which has more than twice the number of teeth as pinion 563 is rotatably mounted on a shaft 565 mounted on the baseplate 506. A heart-shaped cam 566 eccentric to the gear 564 is secured to one side of the gear 564. A lever 567 having a cam following end that contacts the cam surface of the cam 566 is rockably supported on a fixed pin 568. The other end of the lever 567 projects through the rear cover 508, and on that end is slidably mounted a sleeve knob 569. The other structure is substantially the same as that shown in FIGS. 1 to 5. In this embodiment, when the pinion 563 and the indicating plate rotate 1 revolution, the gear 564 and cam 566 rotate half a revolution or less. When the knob 569 is pressed as designated by the arrow shown in FIG. 13, after the frame 502 is opened, the cam 566 rotates back half a revolution, thereby returning the indicating plate to its original position.

Another embodiment of a lever type clutch mechanism of the present invention will now be described. Referring to FIG. 14, a bellcrank rocking lever 621 is formed with an opening 670 in one arm thereof, through which opening a pin 671 is projected at a baseplate 606 is inserted, and the rocking angle of the lever is controlled by this pin. An arm 672 pivotally mounted on a fixed pin 675 mounted on the rear cover 608 includes at its free end an arcuate cam surface 673 and a projection 674 extending from one end of the came surface. A coil spring 677 is connected by one end to a post 676 projected from one end section of the arm 672 and by the other end to one end section of a bellcrank actuating lever 624. To the other end section of the lever 621 is formed a follower pin 678 which slidingly engages the cam surface 673 of the arm 672. Reference numerals 607, 610, 611, 612, 613, 614, 616, 617, 622, 623, 625, 628, 629, 630 and 631, are substantially the same as those of the corresponding elements shown in FIGS. 1 to 5. In this embodiment, when the frame 602 is pivoted to the closed position, the actuating lever 624 rocks clockwise (FIG. 14) against the spring 628, thereby to rock the arm 672 clockwise through the bias of a spring 677. As the arm 672 rocks, the cam surface 673 causes the rocking lever 621 to move the follower pin 678 of the rocking lever counterclockwise (FIG. 14), thereby bringing the rear 623 into engagement with both gears 612 and 617. When the frame 602 is pivoted to the open position the actuating lever 624 is rocked counterclockwise (FIG. 14) by the bias of the spring 628, whereby at first the segment 672 rocks counterclockwise to separate the cam surface 673 from the follower pin 678, then immediately thereafter the rocking lever 621 rocks clockwise, thereby to move the rocking gear 623 out of engagement with the gear 617.

FIG. 15 shows another embodiment of the present invention including mechanism for compensating a recording paper supporting disc 709 and indicating plate simultaneously with the compensation of an hour hand 740 and minute hand 738 when the clock mechanism stops or is slow. The clock mechanism comprises a barrel 779 in which a hair spring is mounted, a main wheel 780 for receiving the rotary force of the hair spring, a center pinion 781 slidably secured to a minute wheel arbor 737 and engaged with the main wheel 780, a center wheel 782 secured to the center pinion 781, a center disc 783 secured to the minute hand shaft 737, a center spring washer 784 disposed between the center disc 783 and the center wheel 782, a first minute wheel 785 secured to the minute wheel arbor 737, a minute hand 738 secured to the end of the minute wheel arbor 737, a second minute wheel 786 engaged with the first minute wheel 785 and secured to the interlocking shaft 713, a minute pinion 787 also secured to the interlocking shaft 713, an hour wheel 788 engaged with the minute pinion 787 and secured to the hour wheel pipe 739, and an hour hand 740 secured at the end of the hour wheel pipe 739. A governor (not shown) is engaged with the center wheel 732. A compensating knob 789 is secured to a shaft 790 rotatably journaled in the baseplate 706 and rear cover 708, and a compensating gear 791 secured to the shaft 790 engages the minute wheel 786. A portion of the knob 789 extends outwardly of the rear cover 708 through an aperture 792 formed therein to enable an operator manually to rotate the knob. The indicating mechanism shown in FIGS. 1 to 5 is engaged through the gear transmitting means and clutch means in the supporting disc gear 712. After the frame 702 is pivoted to the open position the knob 789 may be manually rotated thereby to rotate the minute hand 738 through the wheels 791, 786 and 785 and the hour hand 740 through the shaft 713, wheel 787 and 788. Thus, the minute and hour hands may be rotated to compensate for any time losses in the mechanism. Simultaneously, the motion of the wheel 786 is transmitted through the shaft 713, gear 714, 712 to the recording paper supporting disc 709, thereby to rotate the supporting disc 709 as the minute and hour hands 738 and 740 together with the indicating plate are rotated. In this manner the correlation of the recording paper the indicating plate, and the time hands is correctly maintained when the recording paper is attached.

The reference numerals 701, 704, 705, 710, 711 are substantially the same as the corresponding elements shown in FIGS. 1 to 3.

It will be understood that various changes in the details, materials and arrangements of parts which have been described herein and illustrated in order to explain the nature of this invention, may be made by those skilled in the art within the principle and scope of the invention.

I claim:

1. In a tachograph having means for measuring and means for recording the measurements, said means for recording the measurements including a movable recordable surface and means to inscribe visible marks on said recordable surface, an improvement comprising
    means for driving said recording means; means providing a visual indication of the extent to which said recordable surface has been recorded while said inscribing means is operating, said visual indication means including a movable indicia surface having indicia inscribed thereon; means for driving said movable indicia surface; and means for automatically interrupting the drive means for said movable indicia surface at a predetermined point in the recordation of said recordable surface.

2. In a tachograph having means for measuring and means for recording the measurements, said means for recording the measurements including a movable recordable surface and means to inscribe visible marks on said recordable surface, an improvement comprising
    means for driving said means for recording measurement; means providing a visual indication of the extent to which said recordable surface has been recorded while said inscribing means is operating, said visual indication means including a movable indicia surface having indicia inscribed thereon; means for driving said movable indicia surface; a tachograph frame; a recording support frame held by said tachograph frame for supporting said movable recordable surface; means for separating part of said recording support frame from said tachograph frame to provide for exchange of recordable surfaces on said recording support frame; and means for automatically interrupting the movement of said movable indicia surface when said part of said recording support frame is separated from said tachograph frame.

3. In a tachograph as set forth in claim 2 wherein said movable indicia surface is movable through a cycle having a predetermined starting point and a predetermined terminating point and means for automatically returning said movable indicia surface to the starting point of said movable indicia surface when the means for automatically interrupting the movement of said movable indicia surface is actuated.

4. In a tachograph as set forth in claim 2 wherein said movable indicia surface is movable through a cycle having a predetermined starting point and a predetermined terminating point and means for manually returning said movable indicia surface to the starting point of said movable indicia surface after part of said recording support frame has been separated from said tachograph frame.

5. In a tachograph as set forth in claim 2 wherein said means for driving said movable indicia surface includes a clock means and a gear train connecting said clock means to said movable indicia surface, said gear train including a plurality of gears, said means for automatically interrupting the movement of said movable indicia surface including clutch means interposed between two of said plurality of gears for providing a selective driving connection between said two gears, whereby the actuation of said clutch means interrupts the driving connection between said two of said plurality of gears.

6. In a tachograph having means for measuring and means for recording the measurements, said means for recording the measurements including a movable recordable surface and means to inscribe visible marks on said recordable surface, an improvement comprising means for driving said means for recording measurements:
means providing a visual indication of the extent to which said means for recording the measurements including a movable recordable surface and means to inscribe visible marks on said recordable surface, an improvement comprising
means for driving said means for recording measurement;
means providing a visual indication of the extent to which said recordable surface has been recorded while said inscribing means is operating, said visual indication means including a movable indicia surface having indicia inscribed thereon; means for driving said movable indicia surface; a tachograph frame; a recording support frame held by said tachograph frame for supporting said movable recordable surface; means for separating part of said recording support frame from said tachograph frame to provide for exchange of recordable surfaces on said recording support frame; and means for automatically interrupting the movement of said movable indicia surface when said part of said recording support frame is separated from said tachograph frame.

7. In a tachograph having means for measuring and means for recording the measurements, said means for recording the measurements including a movable recordable surface and means to inscribe visible marks on said recordable surface, an improvement comprising means for driving said means for recording the measurements; a circular member having a front surface exposed to view externally of the tachograph and a rear surface closed to view externally of the tachograph; and means providing a visual indication of the extent to which said recordable surface has been recorded including a rotatable disc positioned adjacent the rear surface of said circular member, and means connected to said rotatable disc for driving it rotationally, said disc having a front face which has a spiral-shaped area distinguished from the remainder of the front face by coloring, the outer perimeter of said spiral-shaped area coinciding with the periphery of said disc, the width of the spiral-shaped colored area being utilized to indicate the extent to which said recordable surface has been recorded, said circular member having formed therein an elongated slot coinciding substantially with the radius of said rotatable disc and positioned to expose a narrow strip of said disc extending from the periphery of said disc substantially to the axial center of said disc, said circular member having inscribed thereon in a predetermined sequence a plurality of indicia adjacent to the elongated slot, whereby as said disc rotates and moves the colored area past the elongated slot, the width of the colored area at the elongated slot, read in conjunction with said indicia, provides the viewer with a ready indication of the extent to which said recordable surface has been recorded.